June 25, 1968    N. R. REYBURN    3,389,427
APPARATUS FOR MOLDING PREFORMS OF THERMOSETTING PLASTICS
Filed Oct. 23, 1965    8 Sheets-Sheet 1

INVENTOR.
NATHANIEL R. REYBURN
BY Philip M. Rice
& W. A. Schaich
ATTORNEYS

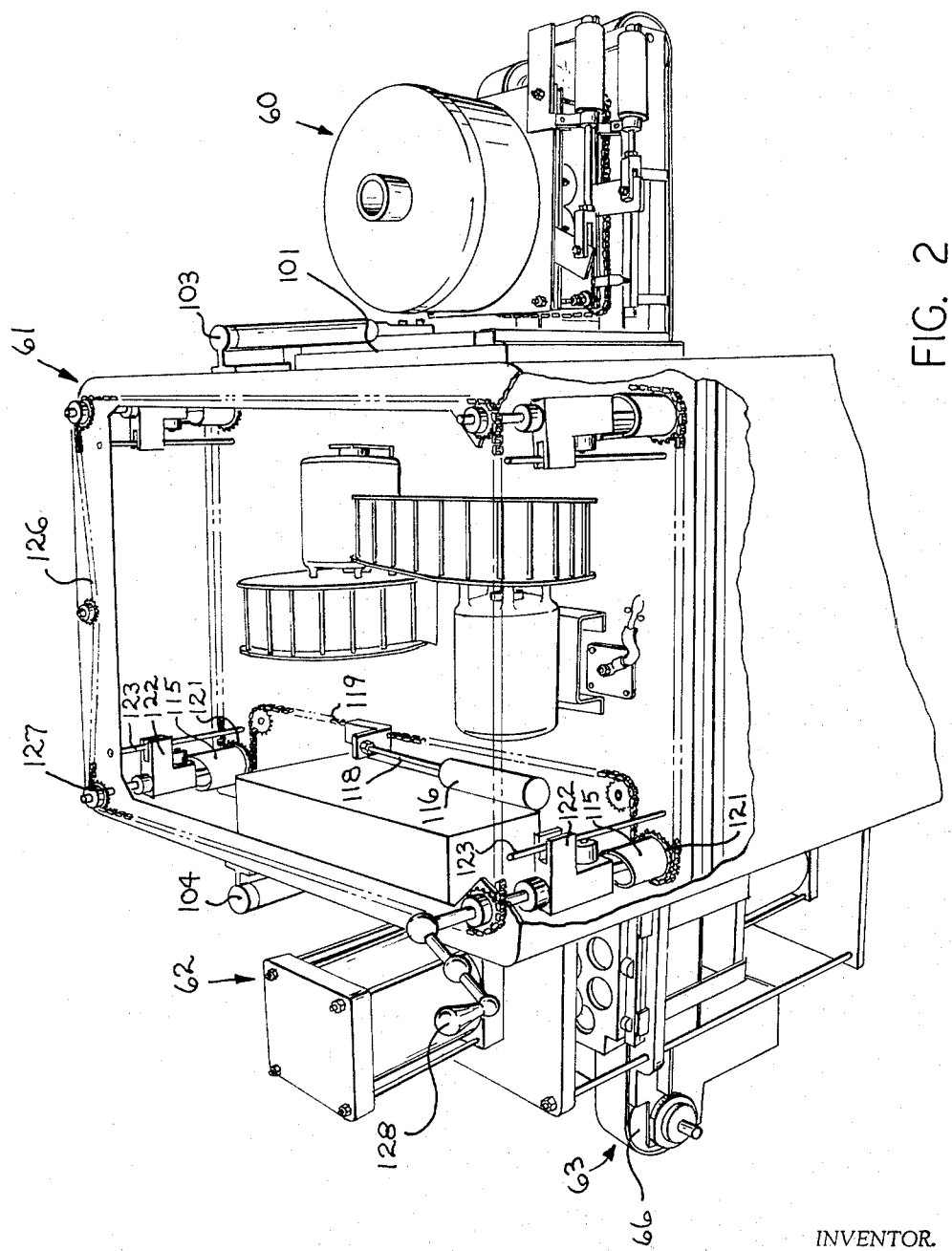

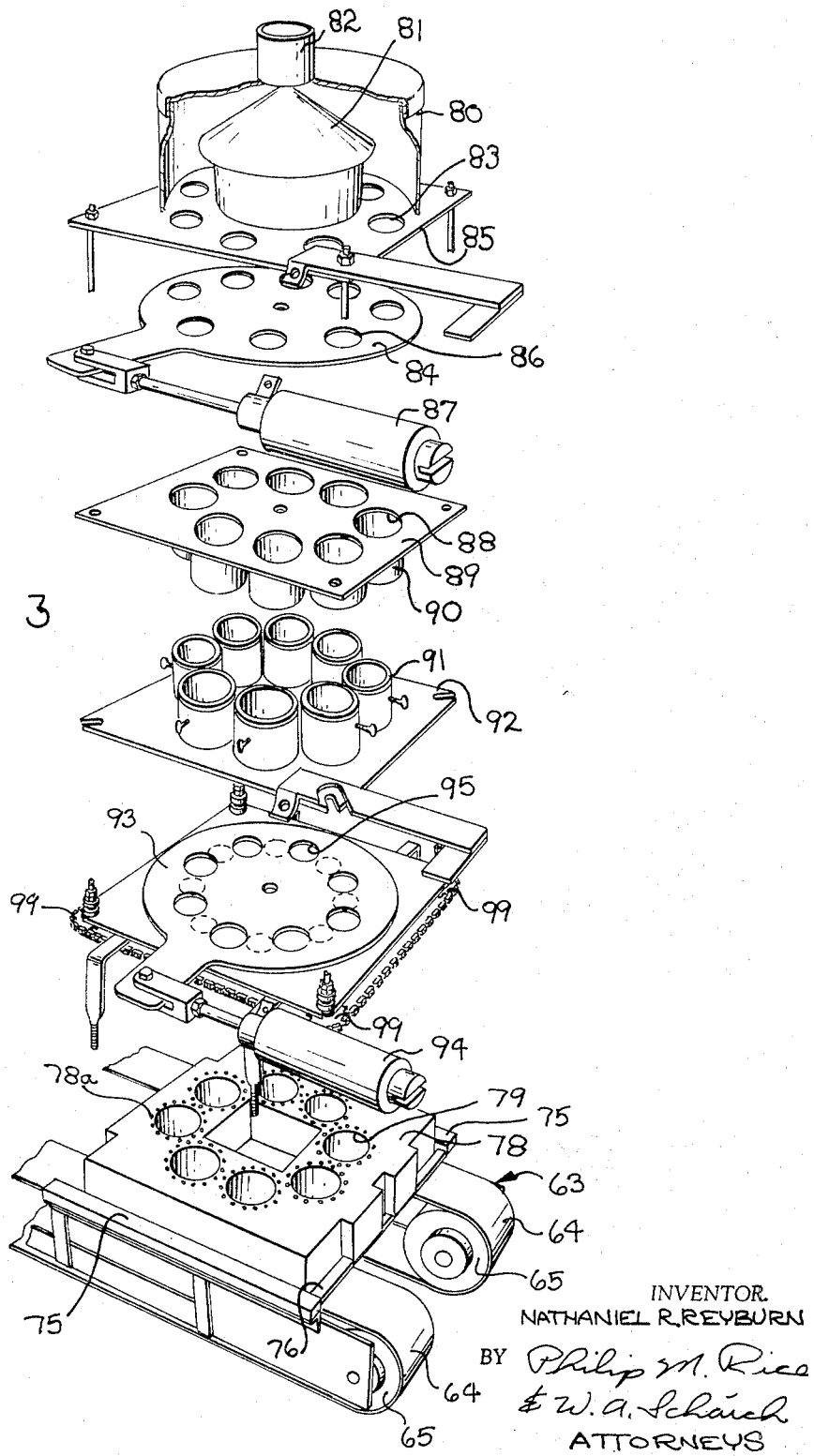

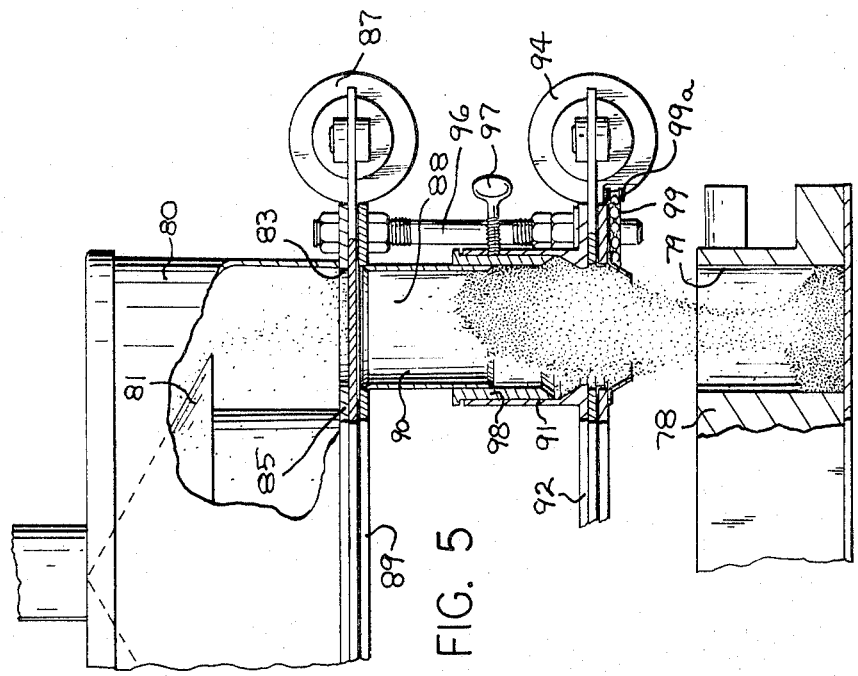
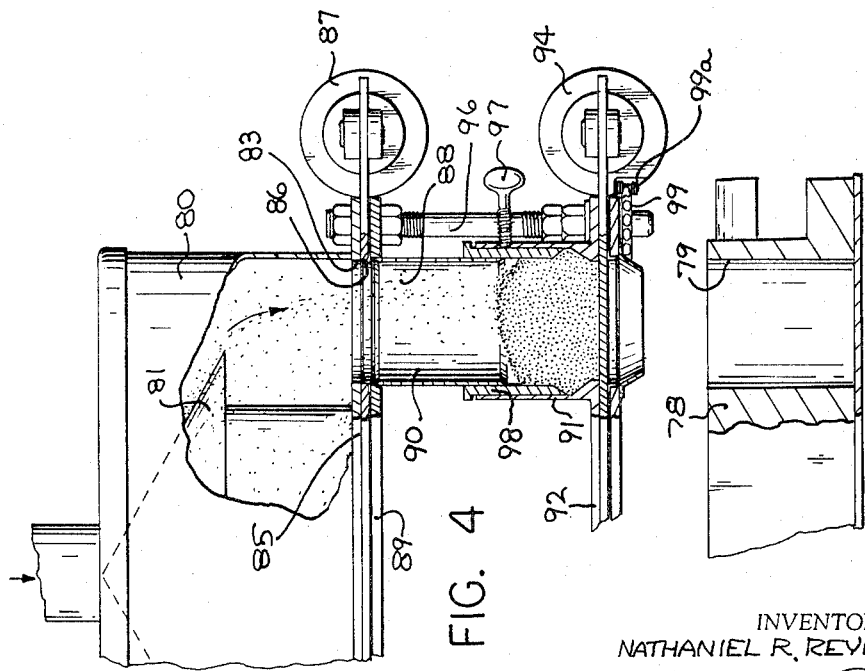

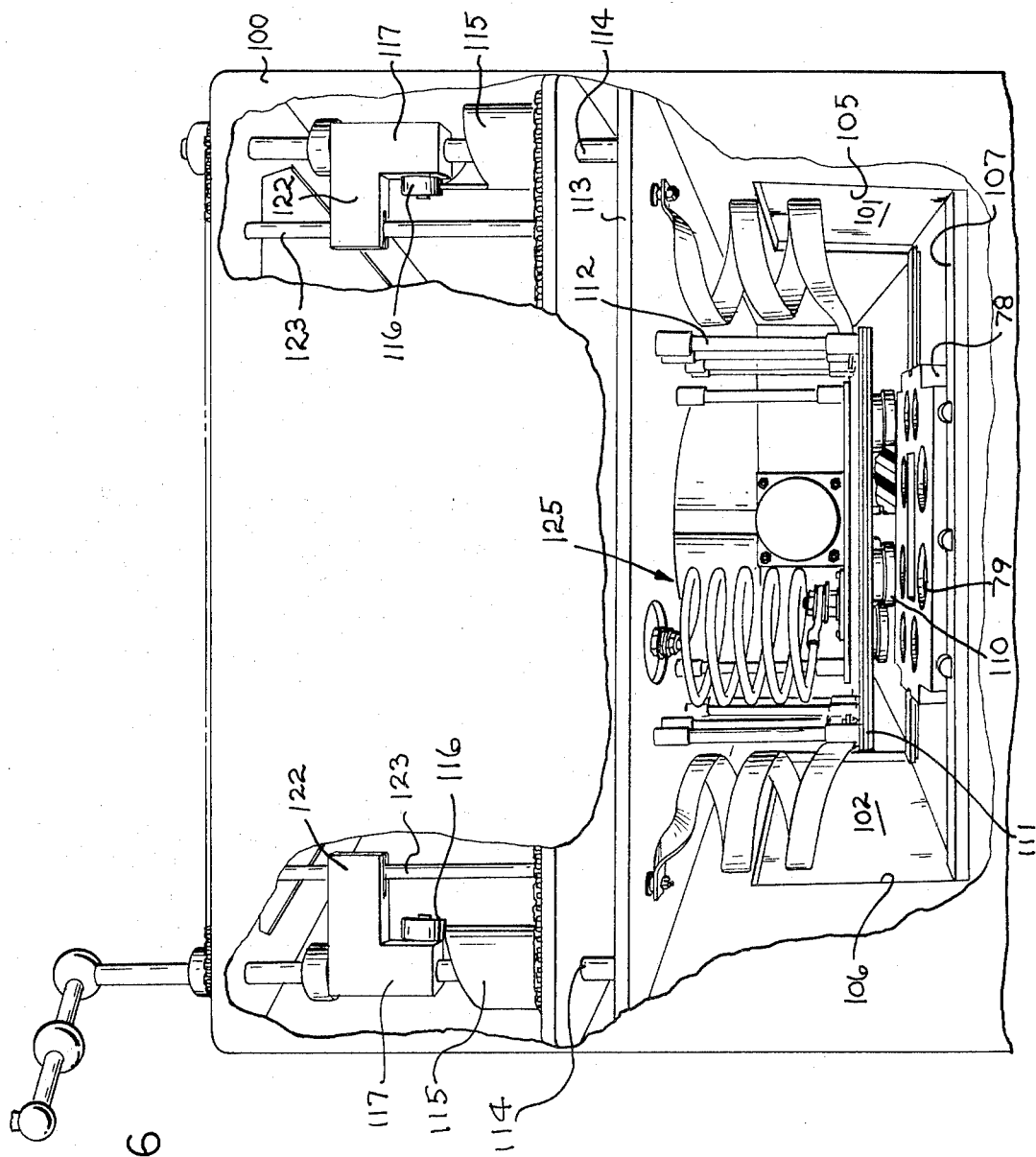

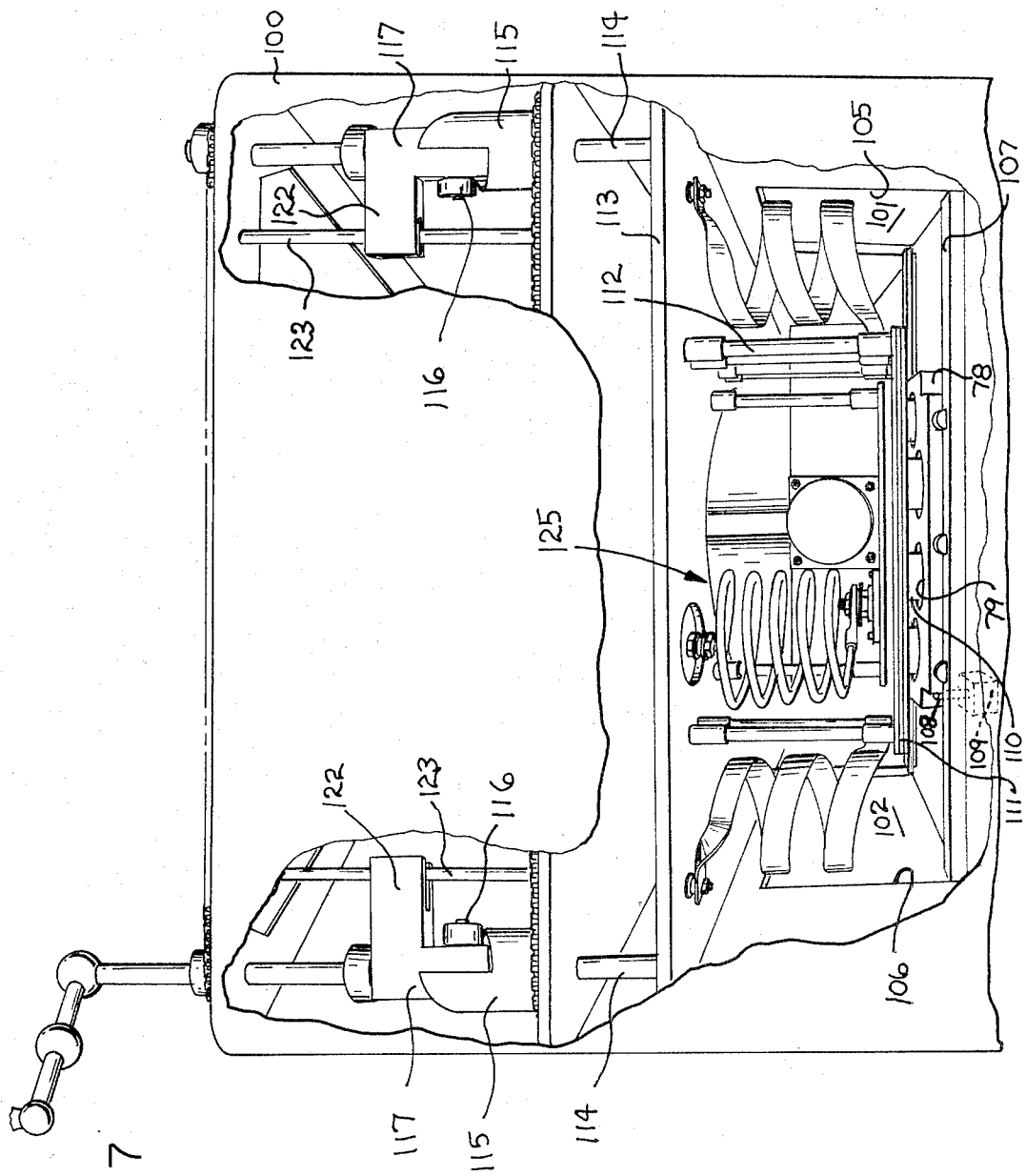

June 25, 1968  N. R. REYBURN  3,389,427
APPARATUS FOR MOLDING PREFORMS OF THERMOSETTING PLASTICS
Filed Oct. 23, 1965  8 Sheets-Sheet 8

INVENTOR.
NATHANIEL R. REYBURN
BY Philip M. Rice
& W. A. Schaich
ATTORNEYS

United States Patent Office 3,389,427
Patented June 25, 1968

3,389,427
APPARATUS FOR MOLDING PREFORMS OF THERMOSETTING PLASTICS
Nathaniel R. Reyburn, Erie, Pa., assignor to Owens-Illinois, Inc., a corporation of Ohio
Filed Oct. 23, 1965, Ser. No. 503,420
18 Claims. (Cl. 18—4)

ABSTRACT OF THE DISCLOSURE

In the apparatus disclosed herein, predetermined charges of granular thermosetting plastic material such as melamine are fed to nonmetallic cavities which are subsequently heated, preferably by dielectric heating, while pressure is being applied to the charges to soften the material and thereafter are pressed in the cavities by the use of plungers having nonmetallic surfaces and stripped from the cavities. The resultant preforms are uniform in size and quality so that they can be used directly in a finished mold to produce the desired melamine article.

---

This invention relates to molding thermosetting plastics and particularly to molding melamine and the like. The invention is directed to the problem of molding melamine and the like in commercial production to make molded articles of uniform quality.

In accordance with the invention, predetermined charges of granular thermosetting plastic material such as melamine are fed to nonmetallic cavities which are subsequently heated, preferably by dielectric heating, while pressure is being applied to the charges, to soften the material and thereafter are pressed in the cavities by the use of plungers having nonmetallic surfaces and stripped from the cavities. The resultant preforms are uniform in size and quality so that they can be used directly in a finished mold to produce the desired melamine article.

In the drawings:

FIG. 2 is a fragmentary top perspective view of an apparatus, parts being broken away.

FIG. 3 is a fragmentary exploded view of the loading portion of the apparatus.

FIG. 4 is a fragmentary sectional view of the loading portion of the apparatus.

FIG. 5 is a view similar to FIG. 4 showing the parts in a different operative position.

FIG. 6 is a fragmentary perspective view of the heating portion of the apparatus, parts being broken away.

FIG. 7 is a view similar to FIG. 6 showing the parts in a different operative position.

General construction

Figure 1:
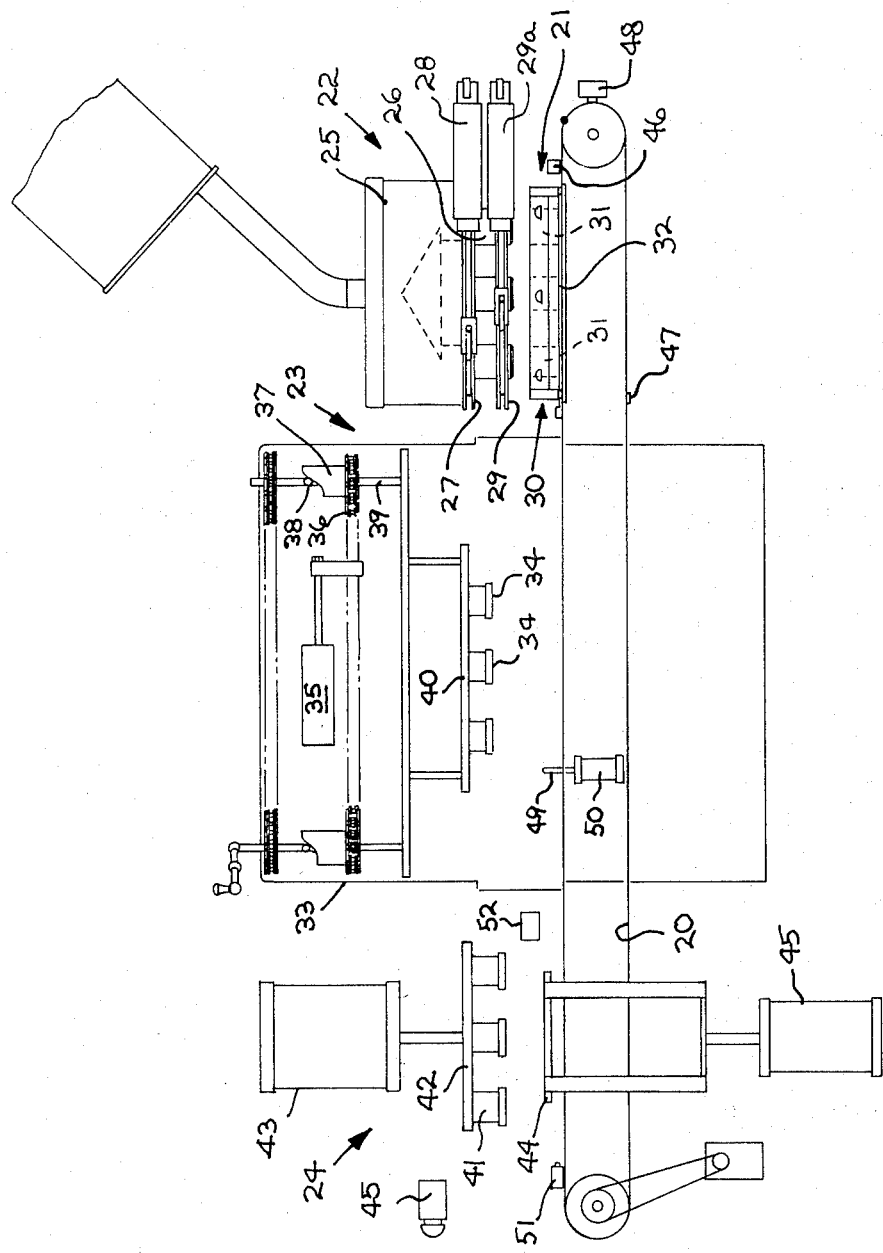
FIG. 1 is a diagrammatic view of an apparatus embodying the invention.

Referring to FIG. 1, which is a diagrammatic view of an apparatus embodying the invention, an endless conveyor 20 is adapted to carry a mold assembly 21 successively to a loading station 22 where predetermined charges of granular thermosetting plastic material are supplied to the cavities of the mold, a heating station 23 wherein pressure and heat are applied to the granular material in the cavities of the mold to soften the material and thereafter to a pressing and stripping station 24 where the heated and softened charges of molten material are pressed to form the preforms and are stripped from the mold cavities.

As shown in FIG. 1, the granular thermosetting plastic material is loaded in a hopper 25 which has a plurality of measuring chambers 26 on the underside thereof. A rotatable disc 27 actuated by a cylinder 28 is operated to open and close communication between the hopper 25 and measuring chambers 26. A second rotatable disc 29 is provided on the lower ends of the measuring chambers 26, the latter being positioned in overlying relationship to the cavities of the mold when the mold is in position. The mold assembly 21 includes a block 30 of a material having a low dielectric loss factor, for example, a nonmetallic plastic material such as polyethylene, which has vertically extending cavities 31 therein, both the upper and lower ends of which are open. The mold block 30 rests on a tray 32 which has a nonmetallic contacting face, for example, a Teflon face. The tray 32 is engaged by a lug on the conveyor 20 which carries the tray 32 and the mold block 30 through the successive stations. When the mold block 30 is in position beneath the hopper 25, the cylinders 28, 29a are actuated to rotate discs 27, 29 so that the measured portions of the granular material in the measuring chambers 26 are isolated from the hopper 25 and the lower ends of the measuring chambers 26 are opened to discharge the portions of granular material into the mold cavities 31. The cylinders 28, 29a are then again actuated to rotate the discs 27, 29 and thereby close the bottom and open the tops of the measuring chambers 26 to permit more granular material to pass into the chambers 26.

The conveyor 20 is then actuated to bring the mold block 30 and tray 32 within the housing 33 at the heating station 23. In the housing, a plurality of plungers 34 having Teflon faces are moved downwardly into the open upper ends of the cavities 31 in the block 30. This motion is achieved by actuation of a cylinder 35 that translates a chain 36 rotating cams 37 to cause the cam followers 38 on shafts 39 to move the shafts 39 downwardly and in turn the plate 40 on which the plungers 34 are mounted downwardly.

The function of the plungers 34 is to level the uneven top of the charges of granular material. Additionally, as the material softens, the plungers are depressed further with the result that increased current passages through the charges. The downward motion also compacts the material. Also, a dielectric heating apparatus (not shown) is provided in housing 33 which applies heat to the granular plastic material while the plungers 34 are applying pressure thereto. Just prior to the termination of the heating, the plungers 34 are elevated to control the heating rate.

After the granular material is heated at the heating station 23, the conveyor 20 is actuated to bring the mold assembly 21 into position at the pressing and stripping station where Teflon faced plungers 41 on a platen 42 are moved downwardly by actuation of a cylinder 43 to press the heated granular material and thereby form the preforms.

After pressing, the mold block 30 is engaged by stripper arms 44 of a cylinder 45 and the mold block 30 is moved upwardly to move the mold block 30 relative to the plungers 41 which are still in position and thereby strip the pressed preforms from the mold cavities.

Plungers 34 and 41 are preferably faced with or made of a nonmetallic, low dielectric loss factor material to facilitate the pressing of the preforms, and prevent accumulation of material on the plungers and mold cavities. A facing of polyethylene or Teflon has been found to be satisfactory.

The entire apparatus and the various movements of the parts are controlled, as will be more clearly evident from subsequent description, so that a complete cycle occurs automatically. At the end of each cycle, the mold assembly 21 including the tray 32 and the mold block 30 are in position at the pressing and stripping station. When the start button 45 is actuated, the mold block 30 is moved onto tray 32 and the conveyor 20 carries the mold assembly 21 to the loading station 22. As the mold assembly 21 arrives at the loading station 22, the tray 32 actuates a limit switch 46 that operates the cylinders 28, 29a to discharge the charges of granular material from the chambers 26 to the cavities 31. After a predetermined interval, the cylinders 28, 29a, are reversed and as the reversal is completed, the conveyor 20 is operated in the opposite direction to carry the block 30 into position at the heating station 23.

A cam 47 on the conveyor belt 20 actuates a limit switch 48 to stop the belt in the proper position at the heating station 23 and to actuate a locating pin 49 on a cylinder 50 and thereby accurately position the mold block 30. Actuation of the limit switch 48 causes operation of the cylinder 35 to lower the plungers 34 and apply pressure to the granular material. Simultaneously, the dielectric heating apparatus is actuated to heat the granular material. At the end of a predetermined interval of time, the cylinder 35 is reversed to lift the plungers 34 and shortly thereafter the application of heat is discontinued and the conveyor 20 is again energized to bring the mold assembly 21 to the pressure and stripping station 24.

As the mold assembly 21 arrives at the station 24, a limit switch 51 is actuated to in turn actuate the cylinder 43 and cause the plungers 41 to move downwardly and press the preforms. As the plungers 41 reach the bottom of their stroke, a limit switch 52 is actuated by platen 42 to in turn actuate the cylinder 45 and move the mold block 30 upwardly and strip the preforms from the cavities of the mold block. The operator then removes the preforms from the tray so that the apparatus is in position for a succeeding cycle. The preforms can thus be placed in a conventional press to form the final articles.

An apparatus embodying the invention is more specifically shown in FIGS. 2–12. Referring specifically to FIG. 2, it can be seen that the apparatus comprises a loading station 60, a heating station 61 and a pressing and stripping station 62. A conveyor assembly 63 carries the molds back and forth between the stations.

*The conveyor assembly*

Figure 8:
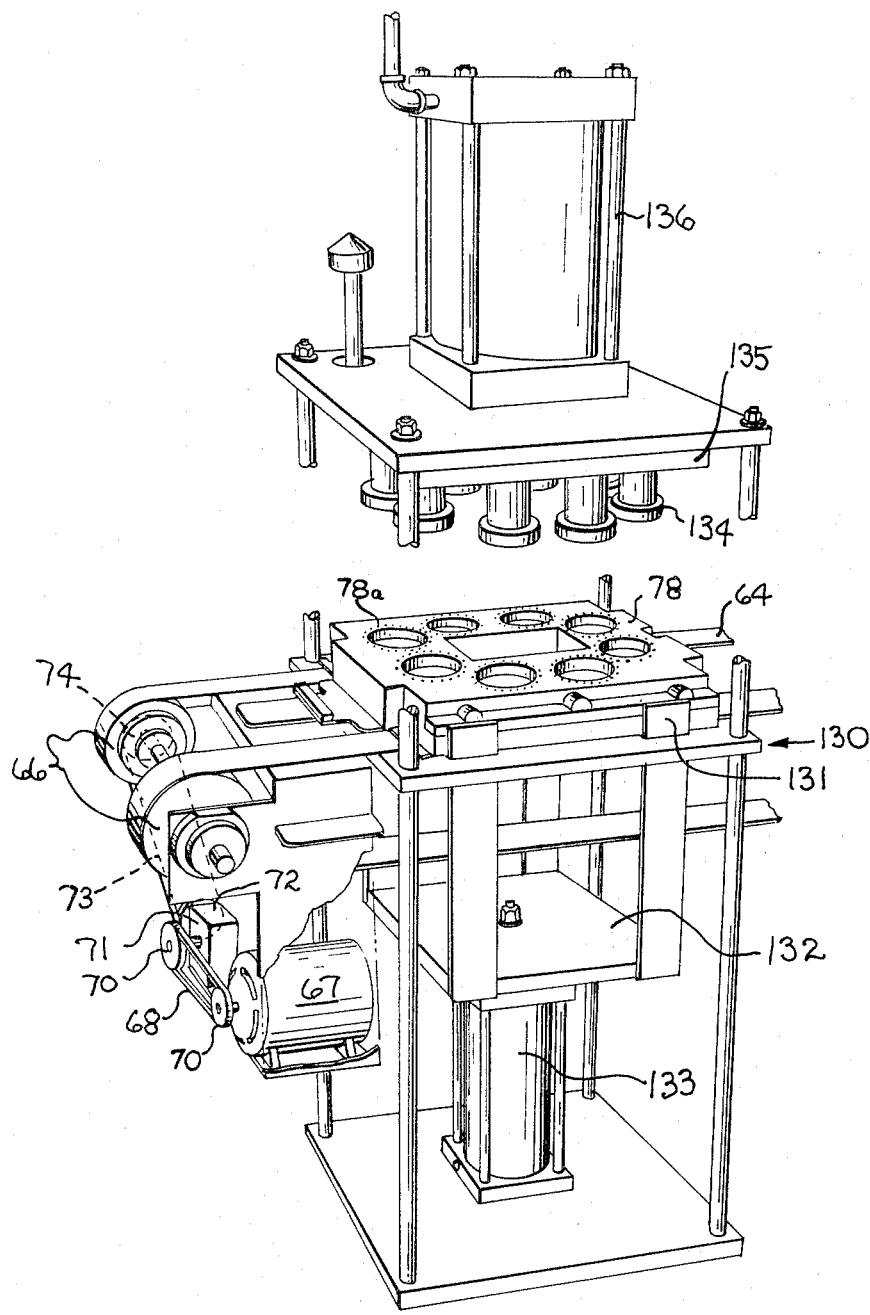
FIG. 8 is a fragmentary perspective view of the pressing and stripping portion of the apparatus.

Referring to FIGS. 3 and 8, a conveyor assembly 63 comprises a pair of endless belts 64 that are trained over idler pulleys 65 adjacent the loading station and powered pulleys 66 adjacent the pressing and stripping station. The driving pulleys 66 are driven by a motor 67, an endless belt 68 and pulleys 70 through a gear box 71 and pulleys 72, 74 and belt 73. Spaced bars 75 on the belt 64 accurately locate a flat tray 76 that is made of nonmetallic material or preferably is made of metal and has a plastic face 77 such as Teflon. The bars 75 also locate a mold block 78 that is made of plastic material such as polyethylene and has cavities 79 both the upper and lower ends of which are open. The block includes vertical holes 78a about the cavities 79 to minimize heat transfer between adjacent charges of melamine. Block 78 also has guide grooves 78b in the longitudinal sides thereof to facilitate locating and gripping of the blocks as presently described. The conveyor belts 64 can be made of any suitable material. However, the portions of the belts that move through the heating station 61 are made of a heat resistant material such as silicone rubber. The upper reach of the belts 64 passes over a table that extends throughout each of the stations.

*Loading station*

The apparatus 60 at the loading station is adapted to deliver predetermined charges of granular thermosetting plastic material such as melamine to the mold cavities 79. As shown in FIG. 3, the apparatus includes a hopper 80 which has a spreader cone 81 that distributes the granular material substantially evenly after it is delivered through a central inlet 82 to the periphery of the hopper in overlying relation to openings 83 that overlie the cavities 79 when the mold block 78 is in loading position. A first cutoff plate 84 is rotatably mounted beneath the bottom wall 85 of the hopper 80 and has a plurality of registering openings 86 therein. The cutoff plate 84 is actuated by cylinder 87. When the openings 86, 83 are in alignment, granular material is permitted to flow through openings 88 in a guide plate 89 and guide tubes 90 into measuring cups or chambers 91 on a support plate 92. During this time, a second cutoff plate 93 beneath the support plate 92 is rotated by a cylinder 94 such that the openings 95 therein are out of alignment with the lower ends of the cups 91. In this manner, the cups 91 are filled with granular material. In order to discharge the contents of the cups into the cavities 79, the cylinders 87, 94 are actuated to rotate the cutoff plate 84 and cut off communication between hopper 80 and the cups 91 and to rotate the plate 93 to open communication between the cups 91 and the mold cavities 79 and thereby permit the granular material to flow downwardly into the cavities 79.

After the material is delivered to the cavities, the cylinders 87, 94 are reversed so that a new quantity of granular material will flow into the cups 91.

The guide tubes 90 are telescoped within the cups 91 so that the quantity of granular material which is to be delivered can be readily varied by moving the guide plate 89 upwardly or downwardly relative to the support plate 92 thereby enlarging or making smaller the overall chambers into which granular material is delivered. Specifically, as shown in FIG. 4, a plurality of adjustable threaded shafts 96 are journalled at their upper ends in guide plate 89 and are threaded into nuts in the support plate 92. The shafts 96 each have a sprocket 99 thereon and a chain 99a is trained over the sprockets so that by rotating one screw all the screws are rotated to change the height of the guide plate 89. Thumb screws 97 hold auxiliary telescoping tubes 98 in position to bridge the gap between guide tubes 90 and cups 91 when the chambers are enlarged.

*Heating station*

Referring to FIGS. 2, 6 and 7, the heating station 61 comprises a housing 100 that includes doors 101, 102 actuated by cylinders 103, 104 to permit ingress and egress of the mold assembly through openings 105, 106. As the mold assembly is brought into position at the heating station through opening 105, the sides of the mold block 78 engages guide rails 107 to accurately locate the block 78 vertically. The guide rails are made of nonmetallic material, such as polyethylene, to minimize heat loss. Simultaneously, a stop pin 108 is caused to move upwardly by actuation of the cylinder 109 to lock the mold block 78 horizontally. A plurality of plungers 110 made of plastic, such as polyethylene, or other material having a low dielectric loss factor, are mounted on the upper dielectric heater grid 111 that is movable vertically downwardly to cause the plungers 110 to enter the upper ends of the cavities 79 and press the plastic material within the cavities with a predetermined force. The lower dielectric heater grid is mounted beneath the belts. The grid 111 is supported by rods 112 on a plate 113. The plate 113 is in turn fixed to shafts 114 that are movable upwardly and downwardly under the control of cams 115. Cam follower rollers 116 on brackets 117 fixed axially on the shafts 114 engage the cams 115 so that as the cams 115 are rotated, the plate 113 and in turn the grid 111 and plungers 110 are moved upwardly and downwardly. As shown in FIG. 2, a cylinder 116 has its piston rod 118 connected to an endless chain 119 that is trained over sprockets 121 that are fixed to the cams 115. The cams 115 in turn are journalled on the shafts 114. The cam follower brackets 117 are prevented from rotation by guides 122 that engage fixed vertical rods 123.

The dielectric power source of the apparatus is mounted on the grill 111 and is generally designated 125. The weight of this apparatus applies a predetermined pressure to the granular material in the cavity 79 and levels the granular material. This insures that the granular material will be heated uniformly.

As the material absorbs heat and begins to plasticize or soften, the charge is compressed. Simultaneously, the grids of the dielectric heater move relatively closer together permitting a greater heat input to the charge material simultaneously. The pressing and heating eliminates loose grains and insures a uniformly of the plasticized or softened preform that is formed.

In the case of melamine, the heating may comprise approximately 30 seconds at a pressure of approximately four pounds per square inch and heat the charges of material to 230° F.

The plungers are then retracted by actuation of the cylinders 116 and the doors 101, 102 are opened by actuation of the cylinders 103, 104 to permit passage of the mold assembly to the pressing and stripping stations.

In order to insure that the plungers will penetrate the cavities only to a predetermined extent, adjusting mechanism is provided and includes an endless chain 126 which is trained over sprockets 127 on the shafts 114 which are threaded into the guide brackets 117. By rotating one of the sprockets through a hand crank 128, the positions of the shafts 114 and in turn of the plungers relative to the cams 115 can be changed.

*Pressing and stripping apparatus*

Figure 11:
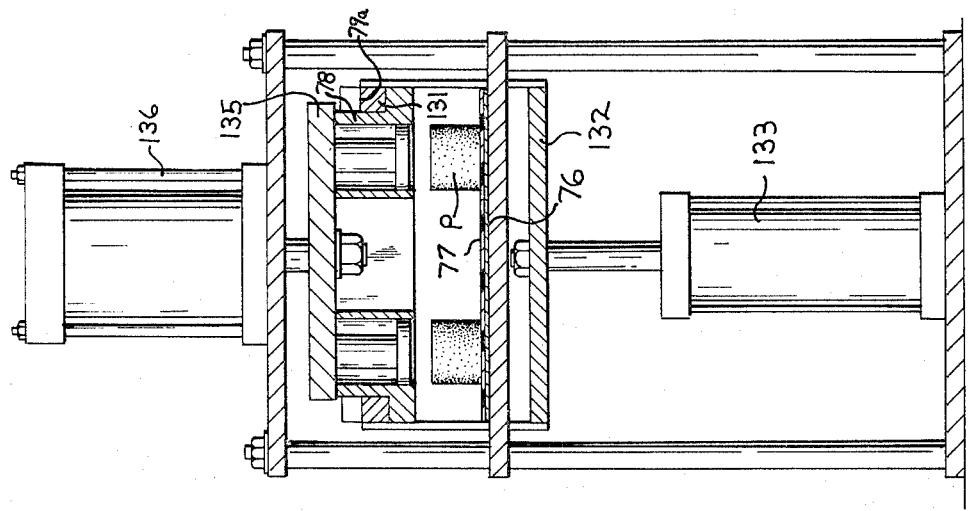
FIG. 11 is a view similar to FIGS. 9 and 10 showing the relative positions of the parts after stripping of the preforms from the mold cavities.
Figure 10:
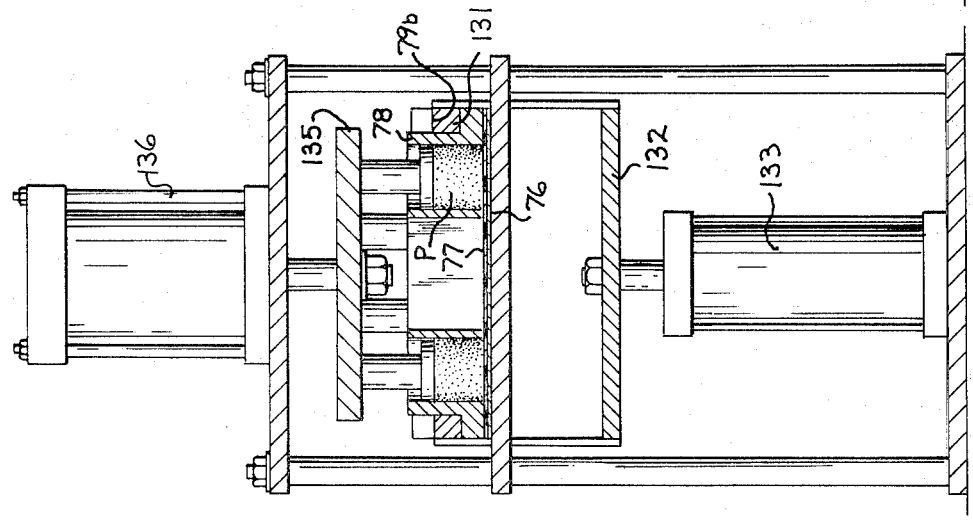
FIG. 10 is a view similar to FIG. 9 showing the relative positions of the parts during pressing.
Figure 9:
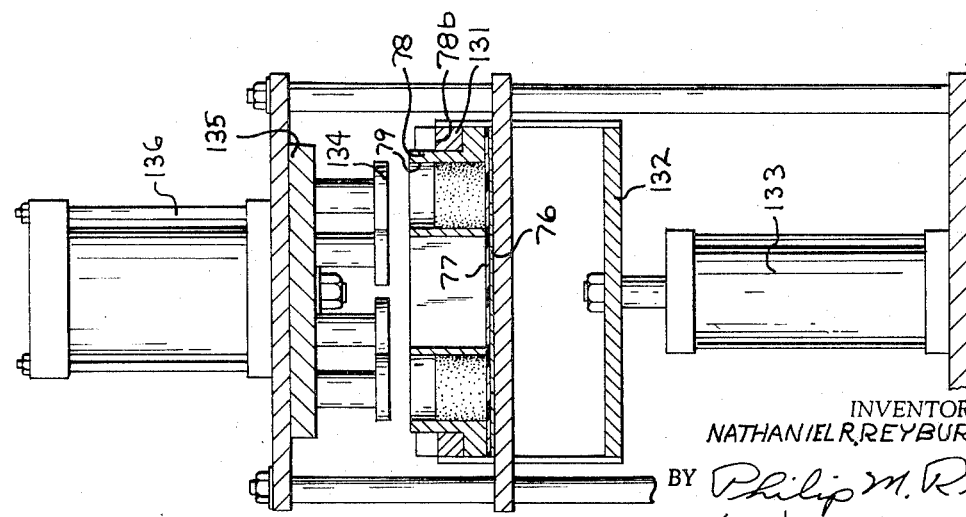
FIG. 9 is a part sectional elevational view of the pressing and stripping portion of the apparatus.

The apparatus at the pressing and stripping station 62 is shown in greater detail in FIGS. 8–11 and comprises a frame 130 through which the belts 64 pass to bring the mold block 78 and tray into position. As the mold block 78 moves into position, it is engaged by slotted arms 131 on the plunger plate 132 of the cylinder 133. A plurality of pressing plungers 134 having plastic coated faces, e.g., polyethylene or Teflon, are mounted on a pressing plate 135 of a cylinder 136 so that when the cylinder 136 is actuated, the plungers are moved downwardly to finally press the plasticized charges of plastic to the shape of the preforms P (FIG. 10). In the case of melamine, the pressure may be approximately 40 pounds per square inch. The cylinder 133 is then actuated to move the mold block 78 upwardly and thereby strip the preforms P from the mold cavities (FIG. 11). The plungers 134 have sharp peripheral edges which engage the sides of the cavities 79 in the mold block to strip the preforms cleanly without leaving any fragments of plastic.

The controls for operating the apparatus can be substantially as shown diagrammatically in connection with FIG. 1 to produce the desired cycle of movement beginning with the downward movement of the mold block onto the tray at the pressing and stripping station and ending with the upward movement of the mold block to strip the preforms from the mold block after the block returns to the pressing and stripping station.

I claim:

1. An apparatus for making preforms of thermosetting plastic material such as granular melamine and the like which comprises
    a mold having a mold cavity,
    said mold being made of a material having a low dielectric loss factor,
    said mold cavity having an open upper end,
    conveyor means for transporting said mold successively through a loading station, a heating station and a pressure applying and stripping station,
    means at said loading station for introducing a predetermined charge of granular material to said mold cavity through the open upper ends of said cavity,
    means at said heating station for applying pressure to said charge through said open upper end of said mold cavity,
    means at the heating station for dielectrically heating said mold charge,
    means at said pressing and stripping station for applying further pressure to said charge through the open upper ends of said cavity to form a preform,
    means at said pressing and stripping station for stripping the resultant preform from the mold cavities by moving the preform axially relative to the mold cavity,
    and means for operating said various elements in a cycle such that the conveyor means transports the mold to the loading station, the means at the loading station delivers the charge to the cavity of the mold, the conveyor means thereafter transports the mold to the heating station, the pressure applying means and heating means apply pressure and heat to the charge in the mold cavity, the conveyor thereafter transports the mold to the pressing and stripping station, the pressing means applies pressure to the charge at the pressing and stripping station to form a preform and the stripping means strips the resultant preform from the mold civities.

2. The combination set forth in claim 1 wherein said means for delivering a predetermined charge of plastic to said mold cavity comprises
    a source of granular material,
    a measuring chamber,
    means between said measuring chamber and said mold cavity for exposing said measuring chamber to said cavity,
    means between said source and measuring cavity for exposing said measuring cavity to said source,
    and means for operating said first and second means alternately.

3. The combination set forth in claim 1 wherein said pressure means at said heating station comprise
    a plunger made of a material having a low dielectric loss factor,
    means for supporting said plunger for movement into and out of the upper end of the mold cavity,
    and means for raising and lowering said last mentioned means.

4. The combination set forth in claim 3 including means for limiting the downward movement of said plunger into said cavity.

5. The combination set forth in claim 3 wherein said heating means are supported on said means for supporting said plunger.

6. The combination set forth in claim 1 wherein said pressing means at said pressing and stripping station comprises
    a plunger,
    means for supporting said plunger,
    and means for moving said plunger into and out of the open upper end of said cavity.

7. The combination set forth in claim 6 wherein said means for stripping said preform from said mold cavity comprises
    means for moving said mold axially upwardly relative to said pressing plunger,
    said mold cavity having an open lower end, whereby when said mold is moved upwardly, said preform is stripped from the mold cavity.

8. An apparatus for making preforms of thermosetting plastic material such as granular melamine and the like which comprises
    a conveyor, a tray having a substantially flat nonmetallic surface,
a mold made of a material having a low dielectric loss factor and having cavities therethrough, whereby the upper and lower ends of the cavities are open,
said mold being adapted to be placed on said tray so that the tray closes the lower ends of said cavities,
means for operating said conveyor so that the mold and tray are moved successively through a loading station, a heating station and a pressure applying and stripping station,
means for delivering predetermined charges of granular material to the mold cavities at the loading station,
means comprising a plurality of plungers made of a material having a low dielectric loss factor for applying pressure to the material at the heating station through the open upper ends of the cavities,
dielectric heating means for heating the material at the heating station,
a plurality of plungers for applying pressure to the heated charges at the pressing and stripping station through the open upper ends of the cavities to shape the heated charges into preforms,
and means for moving the mold relative to said last mentioned plungers for stripping the preforms from the cavities at the pressing and stripping station.

9. The combination set forth in claim 8 wherein said means for delivering predetermined charges of plastic material to said mold cavities comprises
a hopper for granular plastic material,
means defining a plurality of measuring cavities,
said measuring cavities overlying the cavities of the mold when the mold is in position at the loading station,
means providing communication between said hopper and said measuring cavities,
means for opening and closing the upper ends of said measuring cavities,
and means for opening and closing the lower ends of the measuring cavities, whereby measured quantities of granular material may flow from the hopper to the measuring when the lower ends of the measuring cavities are closed and the upper ends of the measuring cavities are opened and thereafter the upper ends of the measuring cavities may be closed and the lower ends of the measuring cavities opened to permit the granular material to flow by the action of gravity into the mold cavities.

10. The combination set forth in claim 8 wherein said plungers in said heating section are mounted on a plate, and means are provided for raising and lowering the plate.

11. The combination set forth in claim 10 wherein said means for raising and lowering the plate comprises
cam means,
cam follower means on the plate,
and means for moving said cam means to cause said cam means to move vertically and thereby move said plate vertically.

12. The combination set forth in claim 11 including means for varying the height of the plungers.

13. The combination set forth in claim 8 wherein said means for moving said mold relative to said plungers at the pressing and stripping stations comprises means for engaging said mold and moving it upwardly relative to said plungers.

14. The combination set forth in claim 8 including a housing at said heating station,
said housing having doors through which the conveyor passes,
and means for opening and closing said doors to open and close the space through which the conveyor passes to permit ingress and egress of the mold.

15. The combination set forth in claim 8 wherein said conveyor comprises an endless belt, at least the portions of the belt which are exposed to heating at the heating station being made of heat resistant material.

16. An apparatus for making preforms of thermosetting plastic material such as granular melamine and the like which comprises
a mold having a plurality of mold cavities,
said mold being made of a material having a low dielectric loss factor,
each said mold cavity having an open upper end,
conveyor means for transporting said mold successively through a loading station, a heating station and a pressure applying and stripping station,
means at said loading station for introducing predetermined charges of plastic to said mold cavities through the open upper ends of said cavities,
means at said heating station for applying pressure to said charges through said open upper ends of said mold cavities,
means at the heating station for dielectrically heating said mold charges,
means at said pressing and stripping station for applying pressure to said heated charges through the open upper ends of said cavities to shape the charges into preforms,
and means at said pressing and stripping station for stripping the resultant preforms from the mold cavities by moving the preforms axially relative to the mold cavities.

17. An apparatus for making preforms of thermosetting plastic material such as granular melamine and the like which comprises
a conveyor,
a tray having a substantially flat nonmetallic upper surface,
a mold made of a plastic material having a low dielectric loss factor and having cavities therethrough, whereby the upper and lower ends of the cavities are open,
said mold being adapted to be placed on said tray so that the tray closes the lower ends of said cavities,
means for operating said conveyor so that the mold and tray are moved successively through a loading station, a heating station and a pressure applying and stripping station,
means for delivering predetermined charges of plastic to the mold cavities at the loading station,
means comprising a plurality of plastic plungers for applying pressure to the material at the heating station through the open upper ends of the cavities,
dielectric heating means for heating the material at the heating station,
a plurality of plungers for applying pressure to the heated material at the pressing and stripping station through the open upper ends of the cavities,
means for moving the mold relative to said last mentioned plungers for stripping the preforms from the cavities at the pressing and stripping station,
and means for operating said various elements in a cycle such that the conveyor transports the mold to the loading station, the means at the loading station delivers the cavities at the mold, the conveyor thereafter transports the mold to the heating station, the pressure applying and heating means apply pressure and heat to the charges in the mold cavity, the conveyor thereafter transports the mold to the pressing and stripping station, the pressing means applies pressure to the charges at the pressing and stripping station and the stripping means strips the resultant preforms from the mold cavities.

18. An apparatus for making preforms of thermosetting plastic material such as granular melamine and the like which comprises
a conveyor,
a tray having a substantially flat upper plastic surface,
a plastic mold having cavities therethrough, whereby the upper and lower ends of the cavities are open,
said mold being adapted to be placed on said tray so that the tray closes the lower ends of said cavities,
means for operating said conveyor so that the mold and tray are moved successively through a loading station, a heating station and a pressure applying and stripping station, means for delivering predetermined charges of granular material to the mold cavities at the loading station, means at the heating station for engaging the mold, means comprising a plurality of plastic plungers for applying pressure to the material at the heating station through the open upper ends of the cavities, dielectric heating means for heating the material at the heating station, a plurality of plungers with plastic faces and sharp peripheral edges movable downwardly for applying pressure to the heated material at the pressing and stripping station through the open upper ends of the cavities, and means for moving the mold upwardly relative to said last mentioned plungers for stripping the preforms from the cavities at the pressing and stripping station.

References Cited

UNITED STATES PATENTS

| | | | |
|---|---|---|---|
| 1,754,484 | 4/1930 | Pelton | 25—2 |
| 2,640,234 | 6/1953 | Bergami | 164—193 |
| 2,669,758 | 2/1954 | Valyi | 164—193 X |
| 3,059,275 | 10/1962 | Vogt. | |
| 3,200,449 | 8/1965 | Hatch | 164—193 |
| 2,647,283 | 8/1953 | Quear | 264—119 |

FOREIGN PATENTS 1,260,137   3/1961   France.

WILBUR L. McBAY, *Primary Examiner.*